(12) United States Patent
Ling et al.

(10) Patent No.: US 10,996,409 B2
(45) Date of Patent: May 4, 2021

(54) PLASTIC COMPOSITE LENS ARRAY IN OPTICAL NETWORKS

(71) Applicant: Finisar Corporation, Sunnyvale, CA (US)

(72) Inventors: Wenhua Ling, San Jose, CA (US); Yuheng Lee, San Jose, CA (US)

(73) Assignee: II-VI DELAWARE, INC., Wilmington, DE (US)

( * ) Notice: Subject to any disclaimer, the term of this patent is extended or adjusted under 35 U.S.C. 154(b) by 0 days.

(21) Appl. No.: 16/660,692

(22) Filed: Oct. 22, 2019

(65) Prior Publication Data

US 2020/0124807 A1 Apr. 23, 2020

Related U.S. Application Data

(60) Provisional application No. 62/748,933, filed on Oct. 22, 2018.

(51) Int. Cl.
*G02B 6/42* (2006.01)

(52) U.S. Cl.
CPC .......... *G02B 6/4239* (2013.01); *G02B 6/428* (2013.01); *G02B 6/4244* (2013.01)

(58) Field of Classification Search
None
See application file for complete search history.

(56) References Cited

U.S. PATENT DOCUMENTS

| | | | | |
|---|---|---|---|---|
| 6,861,641 B1* | 3/2005 | Adams | ................ | G02B 6/421 |
| | | | | 250/239 |
| 7,348,203 B2* | 3/2008 | Kaushal | ................ | B81B 7/0041 |
| | | | | 250/239 |
| 8,540,437 B2* | 9/2013 | Lee | ................ | G02B 6/4215 |
| | | | | 385/93 |
| 10,782,474 B2* | 9/2020 | Brusberg | ................ | G02B 6/4292 |
| 2002/0146227 A1* | 10/2002 | Suzuki | ................ | G02B 6/32 |
| | | | | 385/134 |
| 2008/0226228 A1* | 9/2008 | Tamura | ................ | G02B 6/4214 |
| | | | | 385/33 |
| 2010/0322569 A1 | 12/2010 | Ohyama et al. | | |
| 2013/0168537 A1 | 7/2013 | Shin et al. | | |
| 2014/0153881 A1* | 6/2014 | Lift | ................ | G02B 6/43 |
| | | | | 385/89 |

(Continued)

OTHER PUBLICATIONS

International Search Report and Written Opinion dated Dec. 12, 2019, in related PCT Application No. PCT/US2019/057493 (12 pages).

*Primary Examiner* — Tina M Wong
(74) *Attorney, Agent, or Firm* — Blank Rome LLP

(57) ABSTRACT

An optoelectronic assembly may include a PCB and an optical lens. The PCB includes a top surface where at least a portion of the top surface includes a first material with a first thermal property. The optical lens includes a lens frame and an optical portion positioned within the lens frame. The lens frame is coupled to the top surface of the PCB. The lens frame includes a second material with a second thermal property, the second material being different from the first material. The optical portion positioned includes a third material with a third thermal property, the third material being different from the first material and the second material. The third material is optically transparent.

20 Claims, 8 Drawing Sheets

(56) References Cited

U.S. PATENT DOCUMENTS

| | | | |
|---|---|---|---|
| 2014/0294340 A1* | 10/2014 | Yasuda | G02B 6/4257 385/14 |
| 2015/0063764 A1 | 3/2015 | Isenhour et al. | |
| 2016/0109669 A1 | 4/2016 | Moidu et al. | |
| 2020/0124807 A1* | 4/2020 | Ling | G02B 6/428 |
| 2020/0379182 A1* | 12/2020 | Gui | G02B 6/29367 |

* cited by examiner

PLASTIC COMPOSITE LENS ARRAY IN OPTICAL NETWORKS

CROSS-REFERENCE TO RELATED APPLICATION

This application claims the benefit of and priority to U.S. Provisional App. No. 62/748,933 filed Oct. 22, 2018 which is incorporated herein by reference.

FIELD

The application relates generally to a plastic composite lens array in optical networks.

BACKGROUND

Unless otherwise indicated herein, the materials described herein are not prior art to the claims in the present application and are not admitted to be prior art by inclusion in this section.

Optoelectronic components may be used in the conversion of optical signals to electrical signals and/or electrical signals to optical signals. The manner in which various optoelectronic components are assembled or coupled together, including materials thereof, may affect a quality or amount of conversion efficiency for a desired signal output. For example, material properties of some materials used in lens arrays may lead to coupling losses or efficiency losses.

The subject matter claimed herein is not limited to embodiments that solve any disadvantages or that operate only in environments such as those described above. Rather, this background is only provided to illustrate one example technology area where some embodiments described herein may be practiced.

SUMMARY

This Summary is provided to introduce a selection of concepts in a simplified form that are further described below in the Detailed Description. This Summary is not intended to identify key features or essential characteristics of the claimed subject matter, nor is it intended to be used as an aid in determining the scope of the claimed subject matter.

Some embodiments described herein generally relate to a plastic composite lens array in optical networks, e.g., that may be implemented as or in one or more optoelectronic assemblies.

In an example embodiment, an optoelectronic assembly may include a printed circuit board (PCB) including a top surface, at least a portion of the top surface including a first material with a first thermal property. Additionally, the optoelectronic assembly may include an optical lens. The optical lens may include a lens frame coupled to the top surface of the PCB, the lens frame including a second material with a second thermal property, the second material being different from the first material. The optical lens may also include an optical portion positioned within the lens frame, the optical portion including a third material with a third thermal property, the third material being different from the first material and the second material, and the third material being optically transparent.

In another example embodiment, a method to manufacture an optoelectronic assembly may include forming an optical lens. The optical lens may include a lens frame including a lens frame material with a lens frame thermal property. The optical lens may also include an optical portion positioned within the lens frame, the optical portion including an optical portion material with an optical portion thermal property, the optical portion material being different from the lens frame material, and the optical portion material being optically transparent. Additionally, the method may include coupling the optical lens to a top surface of a printed circuit board (PCB) that includes a PCB material with a PCB thermal property, in which coupling the optical lens to the top surface of the PCB includes coupling the lens frame to the top surface of the PCB.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

To further clarify the above and other advantages and features of the present disclosure, a more particular description of the disclosure will be rendered by reference to specific embodiments thereof which are illustrated in the appended drawings. It is appreciated that these drawings depict only typical embodiments of the disclosure and are therefore not to be considered limiting of its scope. The disclosure will be described and explained with additional specificity and detail through the use of the accompanying drawings in which.

DESCRIPTION OF EMBODIMENTS

Figure 1:
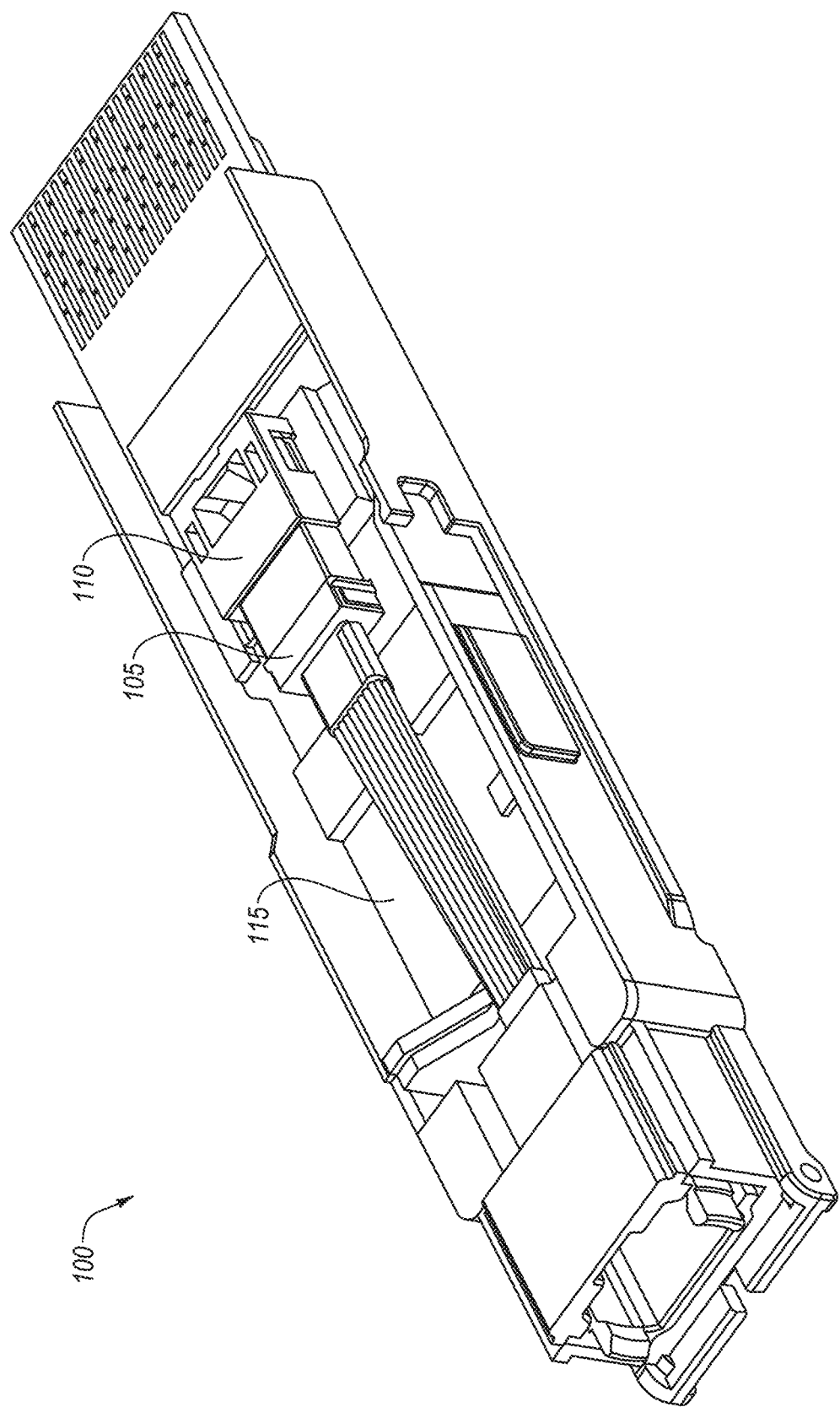
FIG. 1 illustrates a top perspective view of an example optoelectronic module.

In some products or designs, a lens array may be made of one type of plastic, e.g., a single type of plastic formed as a single unitary component coupled to a printed circuit board (PCB). A portion of the lens array may be coupled to the PCB and/or other components of the product, and light may be transmitted through another portion of the lens array. The portion of the lens array coupled to the PCB may be referred to as a lens frame and the portion of the lens array through which light passes may be referred to as an optical portion to distinguish between the two portions. However, both the lens frame and the optical portion are not typically distinguishable as they typically form a unitary component of a single type of plastic in existing lens arrays. Such products or designs may experience lens displacement and/or stress, for example, due to component temperatures during epoxy curing processes and/or normal/max operation of the lens array. Specifically, for example, temperatures of the lens frame and the PCB during epoxy curing processes and/or normal/max operation may cause lens displacement and/or stress due to certain material properties, such as coefficient of thermal expansion (CTE). In particular, a greater mismatch between a CTE of the lens frame and a CTE of the PCB may lead to greater coupling losses or efficiency losses for the lens array. In contrast, a decreased mismatch between the CTE of the lens frame and the CTE of the PCB may decrease coupling losses and/or efficiency losses for the lens array.

Aspects of the present disclosure may include one or more embodiments to decrease the mismatch between the CTE of the lens frame and the CTE of the PCB compared to the other products or designs mentioned above by including a composite lens array. The composite lens array of the present disclosure may incorporate two or more types of plastic in contrast to prior techniques mentioned above that include a single type of plastic for both the lens frame coupled to the PCB and the optical portion positioned within the lens frame. In the techniques mentioned above, translucent plastics (e.g., polyetherimide, polycarbonate, polyurethane, Trivex®, and other translucent plastics) are used as the single plastic material for both the lens frame and the optical portion within the lens frame. Such translucent plastics, however, typically include a relatively high CTE. For example, a CTE of Ultem® (an example polyetherimide) is about $50\times10^{-6}$ m/m ° C., which in some cases, may result in too much displacement and/or stress in the lens array (e.g., too large of an optical coupling loss) when used as the material for both the lens frame and the optical portion within the lens frame.

Aspects of the present disclosure address these and other example problems of other techniques, such as the other products and designs mentioned above. For example, according to one or more embodiments of the present disclosure, the optical portion of the lens array may include a first type of plastic, e.g., a translucent plastic that allows optical signals to pass therethrough. The lens frame, which houses the optical portion of the lens and is coupled to the PCB, may include a second type of plastic different from the first type of plastic. The second type of plastic may have a CTE that is the same as or similar to the CTE of the PCB. By incorporating the second type of plastic in the lens frame, lateral displacement and/or stress of the lens array may be reduced. Additionally or alternatively, a greater number of optical channels may be included in the optical portion of the lens array given a reduced amount of lateral displacement and/or stress.

Reference will now be made to the drawings to describe various aspects of example embodiments of the invention. It is to be understood that the drawings are diagrammatic and schematic representations of such example embodiments, and are not limiting of the present invention, nor are they necessarily drawn to scale.

FIG. 1 illustrates a top perspective view of an example optoelectronic module 100, arranged in accordance with at least one embodiment of the present disclosure. A top housing of the optoelectronic module 100 is depicted (for illustration purposes) in a transparent manner to illustrate various components within the optoelectronic module 100. As illustrated, the optoelectronic module 100 may include a ferrule 105, a lens 110, and a printed circuit board (PCB) 115. The optoelectronic module 100 may additionally include one or more optical signal sources (e.g., one or more lasers or LEDs) and/or one or more optical receivers (e.g., one or more photodiodes). The optical signal sources and/or optical receivers may be mounted to the PCB 115, an interposer, or other suitable structure between the PCB 115 and the lens 110 and may be optically coupled through the lens to one or more optical fibers. In these or other embodiments, the optoelectronic module 100 may be part of a host connection to an optical network. For example, the ferrule 105 may include or be coupled to the one or more optical fibers configured for transmitting optical signals within the optical network. For instance, in some embodiments, inbound optical signals may propagate from the optical fiber(s), through the ferrule 105, through the lens 110, and to the optical receiver(s). Outbound optical signals may be transmitted from the optical signal source(s) through the lens 110, through the ferrule 105, and into the optical fiber(s).

In these or other embodiments, the lens 110 may be physically coupled, either directly or indirectly, to the PCB 115 as described further below with respect to FIG. 3.

Figure 2:
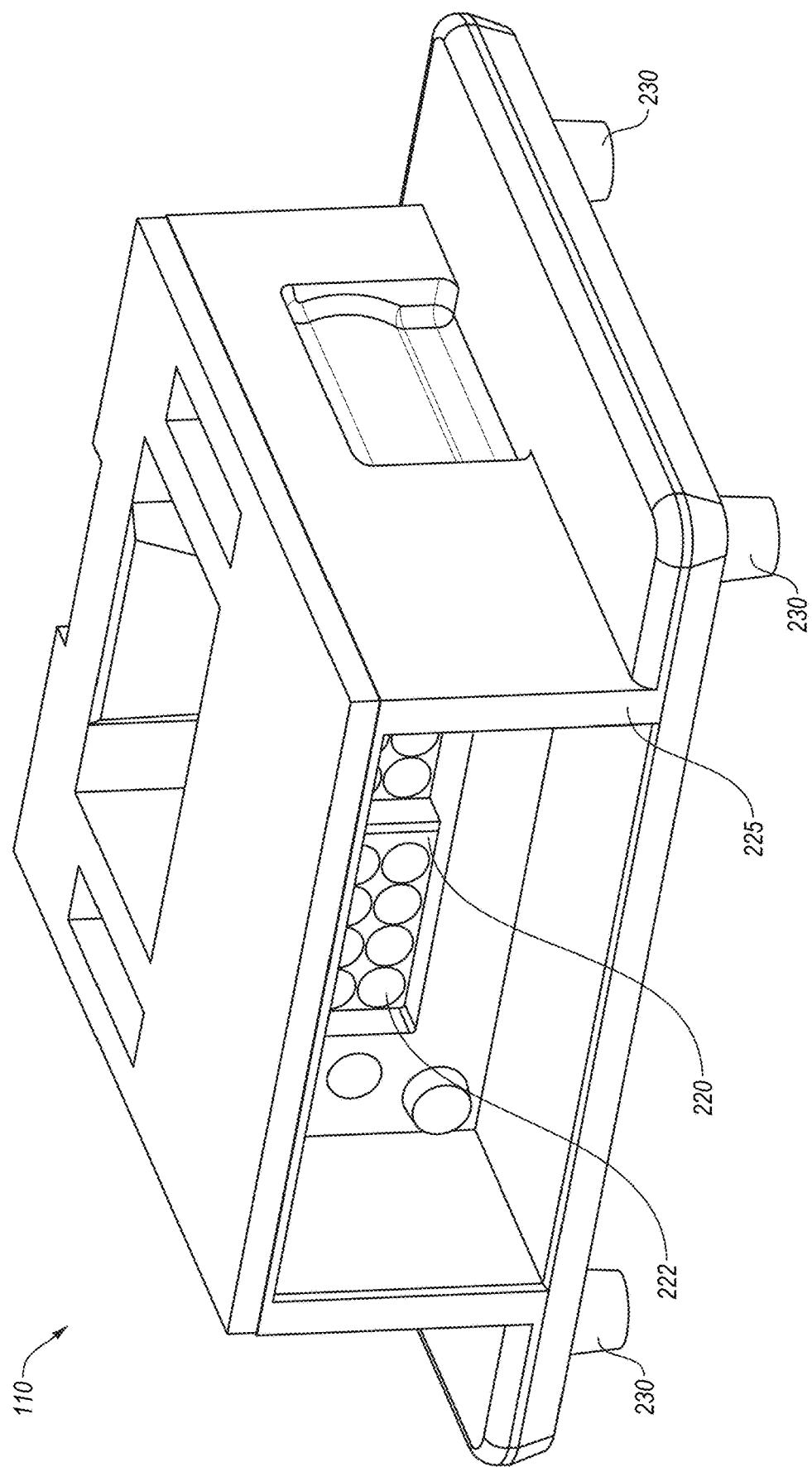
FIG. 2 illustrates a lens of the optoelectronic module of FIG. 1.

FIG. 2 illustrates the lens 110 of the optoelectronic module 100 of FIG. 1, arranged in accordance with at least one embodiment of the present disclosure. As illustrated, the lens 110 may include an optical portion 220 with optical channels 222 (only one channel 222 is labeled in FIG. 2 and other FIGS. for simplicity), a lens frame 225, and legs 230 (only one leg 230 is labeled in FIG. 2 and other FIGS. for simplicity).

In these or other embodiments, the optical portion 220 may be positioned (e.g., housed) within the lens frame 225. In some embodiments, the optical portion 220 may be configured to receive and/or transmit optical signals, e.g., via the optical channels 222 that are configured to connect with a ferrule (such as the ferrule 105 of FIG. 1). Each of the optical channels 222 may include at least one convex lens structure, and possibly more (e.g., two) aligned convex lens structures (e.g., located on opposite sides (in a light propagation direction) of the optical portion 220 and aligned in the light propagation direction), or other suitable structures. The convex lens structure(s) of each optical channel 222 may, for example, collimate an optical signal as the optical signal enters the optical portion 220 and/or focus the optical signal as it exits the optical portion 220.

Figure 4:
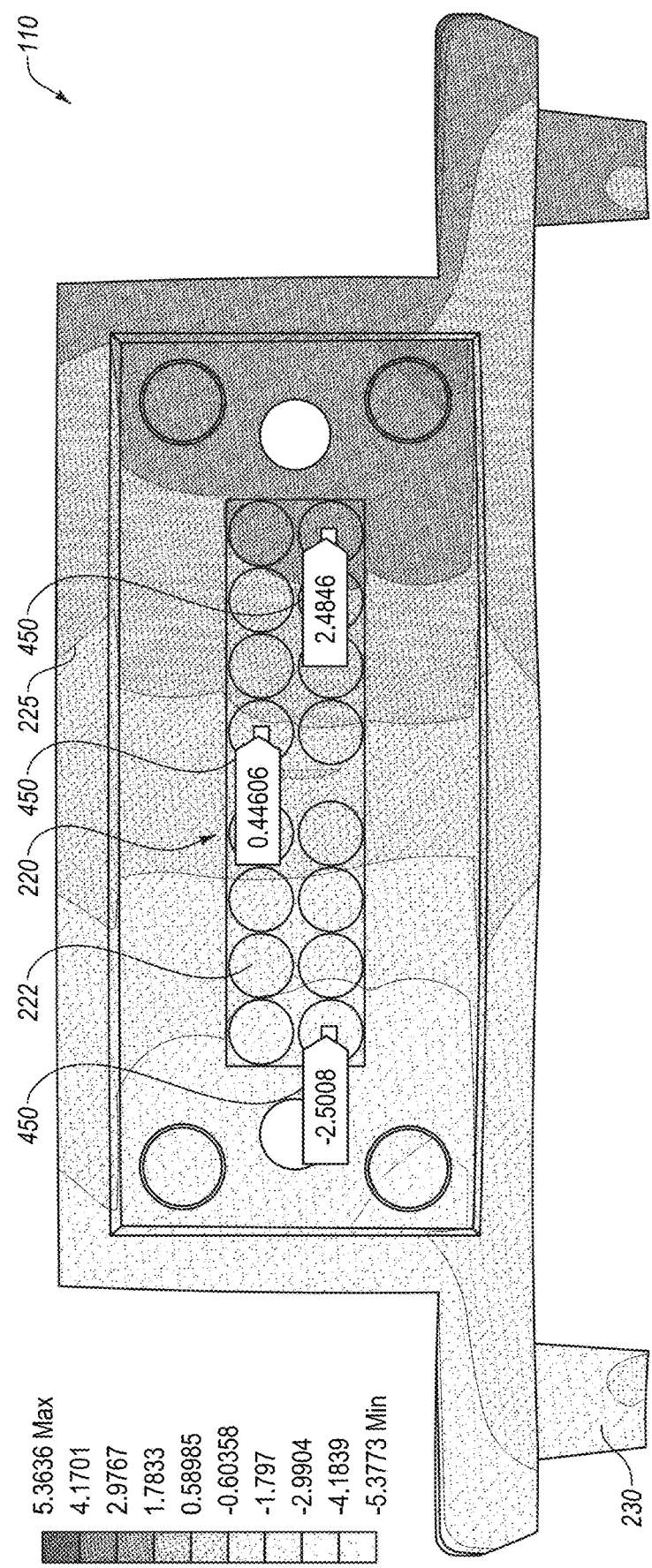
FIG. 4 illustrates the lens of FIG. 1 under lateral displacement analysis (e.g., finite element analysis) at 75° C.
Figure 5:
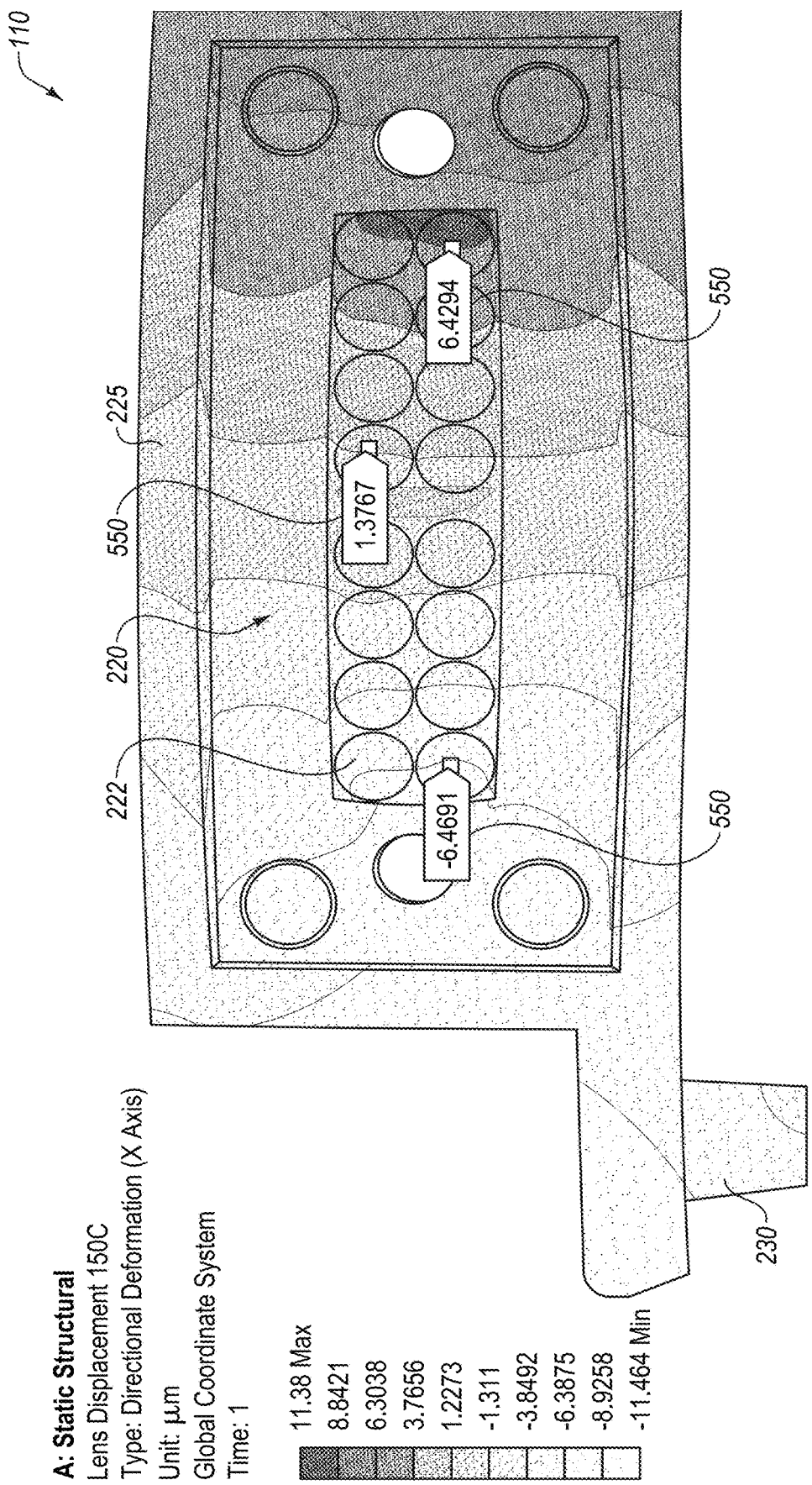
FIG. 5 illustrates the lens of FIG. 1 under lateral displacement analysis (e.g., finite element analysis) at 150° C.

The optical portion 220 is illustrated in one or more of the figures, including FIGS. 4 and 5, as including a total of sixteen optical channels 222. In some examples, eight of the optical channels 222 may be transmit optical channels, e.g., for output optical signals, while the remaining eight of the optical channels 222 may be receive optical channels. Other arrangements are possible.

Additionally or alternatively, the optical portion 220 may be made of a plastic material. The plastic material of the optical portion 220 may be optically transparent, at least with respect to one or more target wavelengths of the optical signals transmitted and/or received by the optoelectronic module 100. The term translucent as used herein may indicate an optical transmissivity of at least 50%, at least 60%, at least 70%, at least 80%, at least 90%, or at least 95% with respect to given wavelength. The plastic material of the optical portion 220 may include one or more of polyetherimide (e.g., Ultem®), polycarbonate, polyurethane, Trivex®, and other translucent plastics. In these or other embodiments, the optically transparent plastic of the optical portion 220 may include a thermal property, such as coefficient of thermal expansion (CTE). The CTE of the optically transparent plastic of the optical portion 220 may be higher than that of other plastics, such as the plastic used in the lens frame 225, and/or than that of a printed circuit board (such as the PCB 115 of FIG. 1). For example, Ultem® (an example polyetherimide) may have a CTE of about $50\times10^{-6}$ m/m ° C., whereas a material of the lens frame 225 and/or of the PCB 115 may have a CTE of, e.g., $14\times10^{-6}$ m/m° C.

In these or other embodiments, the lens frame 225 may be made of a different plastic than the optically transparent plastic of the optical portion 220. For example, the lens frame 225 may include polyether ether ketone (PEEK). Additionally or alternatively, the lens frame 225 may include glass fiber. In these or other embodiments, a CTE of PEEK may be about $14\times10^{-6}$ m/m ° C., and a CTE of glass fiber-filled PEEK may be about $6\times10^{-6}$ m/m ° C. Thus, in some embodiments, the lens frame 225 may be made of a different material with a lower CTE relative to the optically transparent plastic of the optical portion 220, such that the lens 110 is a composite component made of two or more portions with differing CTE properties.

Additionally or alternatively, the plastic of the lens frame 225 may be selected to match or approximate a CTE of a structure to which the lens 110 is coupled (e.g., the PCB 115 of FIG. 1). In these or other embodiments, the material of the lens frame 225 may be configured to reduce displacement and/or stress of the lens 110 as described in greater detail with respect to FIG. 3. Additionally or alternatively, the material of the lens frame 225 may enable a number of the optical channels 222 to be increased to about 20 optical channels, about 22 optical channels, about 24 optical channels, or another suitable number of optical channels as also described in greater detail with respect to FIG. 3.

In some embodiments, one or more portions of the lens frame 225 may be molded. For example, one or more portions of the lens frame 225 may be molded prior to the optical portion 220. In these or other embodiments, the lens frame 225 may include a plastic material with a higher melting temperature than the optically transparent plastic of the optical portion 220. Additionally or alternatively, the optical portion 220 may be overmolded. For example, an optical portion 220 made of Ultem® (having a mold temperature of about 135° C. to about 165° C.) may be overmolded with a lens frame 225 made of PEEK (having a melting temperature of about 343° C.).

In these or other embodiments, the legs 230 may extend downward from a bottom surface of the lens frame 225. Additionally or alternatively, the legs 230 may be configured to interface with (e.g., bond/mount to) a structure, such as the PCB 115 of FIG. 1. A manner in which the legs 230 interface with a corresponding structure is described in additional detail with respect to FIG. 3.

Figure 3:
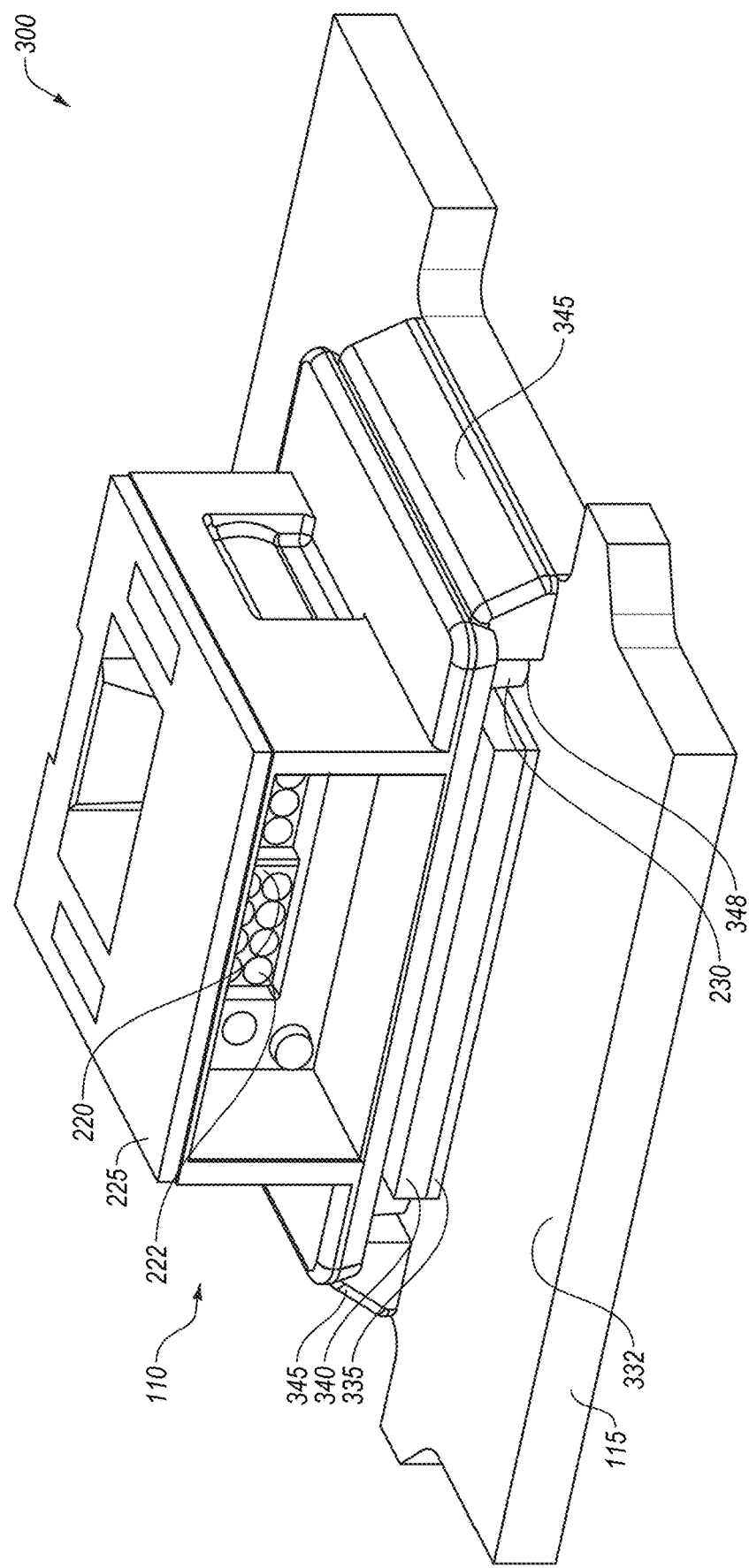
FIG. 3 illustrates an example environment in which the lens of FIG. 1 is coupled (e.g., bonded/mounted) to a PCB of the optoelectronic module of FIG. 1.

FIG. 3 illustrates an example environment 300 in which the lens 110 is coupled (e.g., bonded/mounted) to the PCB 115, arranged according to at least one embodiment of the present disclosure. As illustrated, the environment 300 includes the lens 110, the PCB 115, the optical portion 220, the optical channels 222, the lens frame 225, the legs 230, a top surface 332 of the PCB 115, an underfill layer 335, a chip on glass assembly (COGA) 340, a structural epoxy bond 345, and a UV epoxy bond 348.

In these or other embodiments, the underfill layer 335 may be positioned on a top surface 332 of the PCB 115, for example between the COGA 340 and the PCB 115. In some embodiments, the underfill layer 335 may be configured to couple a bottom surface of the COGA 340 to the top surface 332 of the PCB 115.

In some embodiments, the COGA 340 may be positioned on a top surface of the underfill layer 335, for example between the underfill layer 335 and a bottom surface of the lens 110, and may be electrically coupled to the PCB 115, e.g., via one or more electrical connections. The COGA 340 may include one or more optical signal sources and/or optical receivers, such as one or more lasers, one or more photodiodes, a laser array, and/or a photodiode array, mounted thereon. Each optical signal source and/or each optical receiver may be optically aligned with a corresponding one of the optical channels 222 of the optical portion 220 of lens 110. Additionally or alternatively, the COGA 340 may be spatially separated from the bottom surface of the lens 110 (e.g., based on a height of the legs 230).

In some embodiments, the lens frame 225 may be coupled to the top surface 332 of the PCB 115 via the structural epoxy bond 345. In these or other embodiments, the structural epoxy bond 345 may couple at least a portion of the bottom surface of the lens 110 to the top surface 332 of the PCB 115. Thus, in some embodiments, the structural epoxy bond 345 may have a height, in some positions, equal to a distance spanning between the top surface 332 of the PCB 115 and the bottom surface of the lens 110. Additionally or alternatively, the structural epoxy bond 345 may couple outer edge portions of the lens frame 225 to the top surface 332 of the PCB 115. Thus, in some embodiments, the structural epoxy bond 345 may have a height, in some positions, greater than a distance spanning between the top surface 332 of the PCB 115 and the bottom surface of the lens 110. In these or other embodiments, the structural epoxy bond 345 may be cured at about 150° C.

Additionally or alternatively, the lens frame 225 may be coupled to the top surface 332 of the PCB 115 via the UV epoxy bond 348 between the legs 230 and the top surface 332 of the PCB 115. In these or other embodiments, the UV epoxy bond 348 may include a thickness (e.g., a height for consistency of terminology) of about 10 µm. In some embodiments, the UV epoxy bond 348 may be cured at about 35° C.

In some embodiments, the material of the lens frame 225 may be configured to reduce lateral displacement of the lens 110 in a direction parallel and/or approximately parallel to the top surface 332 of the PCB 115. For example, during curing of the structural epoxy bond 345 at about 150° C., the material of the lens frame 225 may limit lateral displacement of the lens 110 to be an absolute amount of lateral displacement in a closed range of [−12 µm, 12 µm] (see FIG. 5). Additionally or alternatively, during an operational temperature of about 75° C., the material of the lens frame 225 may limit lateral displacement of the lens 110 to be an absolute amount of lateral displacement in a closed range of [−6 µm, 6 µm] (see FIG. 4). In these or other embodiments, the lateral displacement of the lens 110 may be reduced due to the CTE of the PCB 115 and the CTE of the lens frame 225 being similar (e.g., approximately equal) and/or identical to each other. As used herein, two values may be approximately equal if within about 30%, about 20%, or about 10% of each other.

In some embodiments, the material of the lens frame 225 may be configured to reduce stress (e.g., a bending stress) of the lens 110. For example, during curing of the structural epoxy bond 345 at about 150° C., the material of the lens frame 225 may limit bending stress of the lens 110 to be an amount of bending stress in a closed range of [0 MPa, 200

Figure 6:
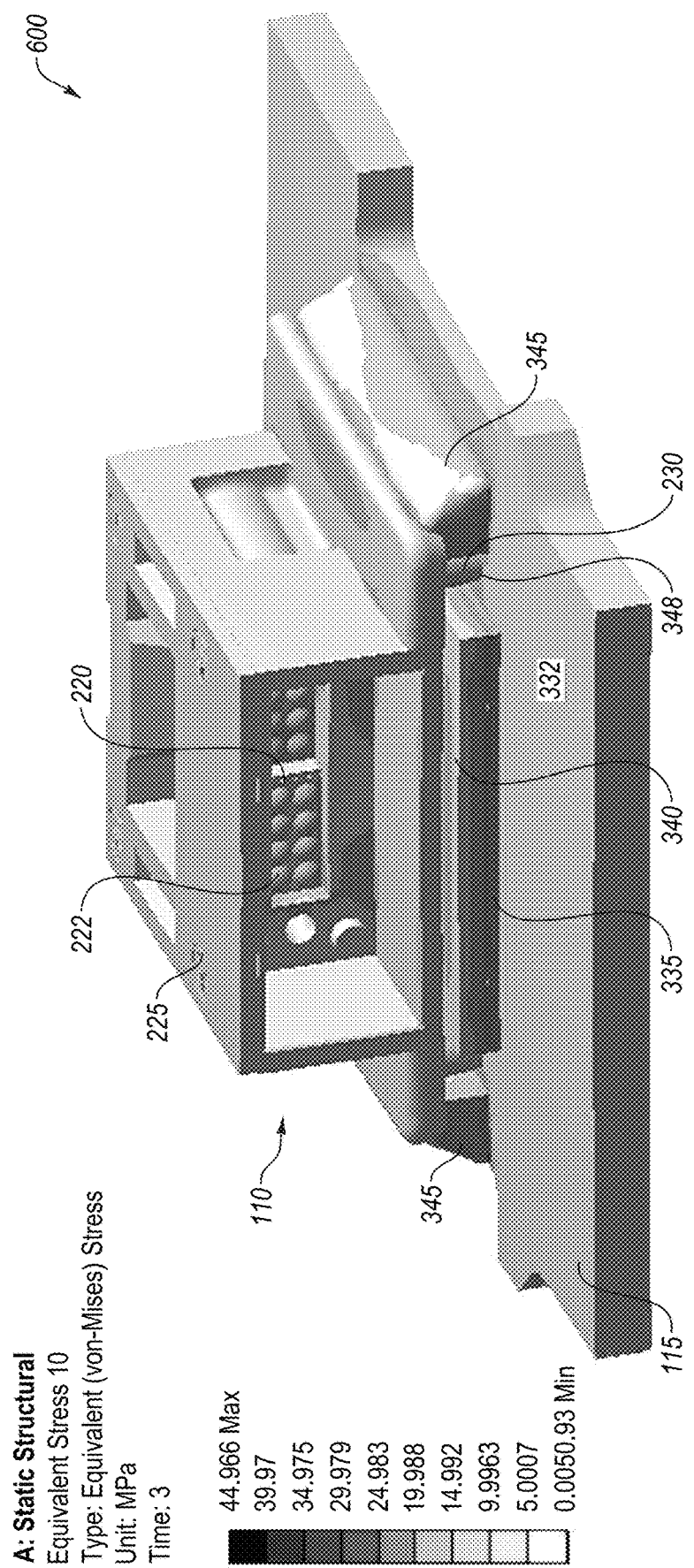
FIG. 6 illustrates an example environment in which the lens, the PCB, and other components of the optoelectronic module of FIG. 1 are under stress analysis (e.g., finite element analysis) at 75° C.
Figure 7:
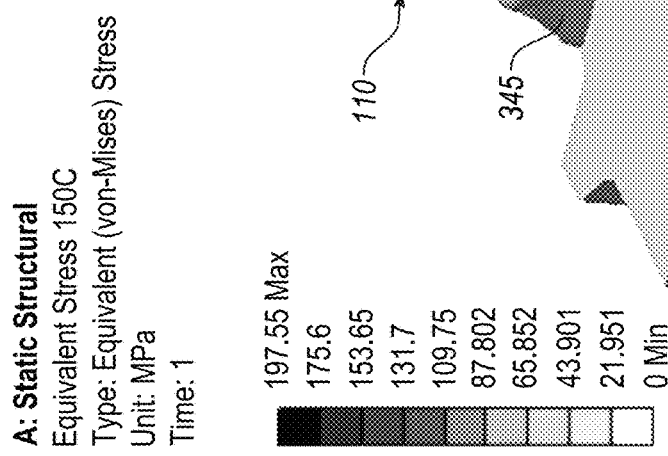
FIG. 7 illustrates an example environment in which the lens, the PCB, and other components of the optoelectronic module of FIG. 1 are under stress analysis (e.g., finite element analysis) at 150° C.

MPa] (see FIG. 7). Additionally or alternatively, during an operational temperature of about 75° C., the material of the lens frame 225 may limit bending stress of the lens 110 to be an amount of bending stress in a closed range of [0 MPa, 50 MPa] (see FIG. 6). In these or other embodiments, the bending stress of the lens 110 may be reduced due to the CTE of the PCB 115 and the CTE of the lens frame 225 being similar (e.g., approximately equal) and/or identical to each other.

In some embodiments, the material of the lens frame 225 may enable an increase in a number of optical channels 222. In some other techniques involving lenses having a single material, a relatively high degree of CTE mismatch between the lens and the PCB has heretofore limited the number of optical channels (e.g., in a row or column of optical channels). Thus, in some embodiments of the present disclosure, the material of the lens frame 225 configured to decrease CTE mismatch may enable an increase in the number of optical channels 222 to about 20 optical channels, about 22 optical channels, about 24 optical channels, or another suitable number of optical channels (albeit the number of optical channels 222 depicted in FIGS. 2-7 is 16 optical channels).

FIG. 4 illustrates the lens 110 under lateral displacement analysis (e.g., finite element analysis) at 75° C., the lens 110 arranged according to at least one embodiment of the present disclosure. As illustrated, the lens 110 includes the optical portion 220, the optical channels 222, the lens frame 225, the legs 230, and displacement markers 450. In these or other embodiments, the displacement markers 450 may indicate a respective amount of lateral displacement for a corresponding position (e.g., a specific optical channel 222). As shown by the displacement markers 450 in FIG. 4, an absolute amount of lateral displacement of the lens 110 may be in a closed range of [−6 μm, 6 μm] given that the lens frame 225 in FIG. 4 includes PEEK. In other embodiments, an absolute amount of lateral displacement of the lens 110 at 75° C. may be in a closed range of [−3 μm, 3 μm] given a lens frame 225 including glass fiber-filled PEEK. In comparison, some other techniques (e.g., including Ultem® for both the fiber-filled PEEK In comparison, some other techniques (e.g., including Ultem® for both the optical portion 220 and the lens frame 225) at 75° C. may result in an absolute amount of lateral displacement of a corresponding lens being in a closed range of [−20 μm, 20 μm].

FIG. 5 illustrates the lens 110 under lateral displacement analysis (e.g., finite element analysis) at 150° C., the lens 110 arranged according to at least one embodiment of the present disclosure. As illustrated, the lens 110 includes the optical portion 220, the optical channels 222, the lens frame 225, the legs 230, and displacement markers 550. In these or other embodiments, the displacement markers 550 may indicate a respective amount of lateral displacement for a corresponding position (e.g., a specific optical channel 222). As shown by the displacement markers 550 in FIG. 5, an absolute amount of lateral displacement of the lens 110 may be in a closed range of [−12 μm, 12 μm] given that the lens frame 225 in FIG. 5 includes PEEK. In comparison, some other techniques (e.g., including Ultem® for both the optical portion 220 and the lens frame 225) at 150° C. may result in an absolute amount of lateral displacement of a corresponding lens being in a closed range of [−35 μm, 35 μm].

FIG. 6 illustrates an example environment 600 in which the lens 110, the PCB 115, and other components are under stress analysis (e.g., finite element analysis) at 75° C., the environment 600 arranged according to at least one embodiment of the present disclosure. As illustrated, the environment 600 includes the lens 110, the PCB 115, the optical portion 220, the optical channels 222, the lens frame 225, the legs 230, the top surface 332 of the PCB 115, the underfill layer 335, the COGA 340, the structural epoxy bond 345, and the UV epoxy bond 348. In these or other embodiments, the legend and associated color shading of FIG. 6 may indicate a respective amount of stress for a corresponding position in the environment 600. As shown in FIG. 6, an amount of stress at 75° C. in the environment 600 may be in a closed range of [0 MPa, 50 MPa] given, for example, that the lens frame 225 in FIG. 6 includes PEEK. In comparison, some other techniques (e.g., including Ultem® for both the optical portion 220 and the lens frame 225) at 75° C. may result in stress of a corresponding environment being in a closed range of [0 MPa. 150 MPa], FIG. 7 illustrates an example environment 700 in which the lens 110, the PCB 115, and other components are under stress analysis (e.g., finite element analysis) at 150° C., the environment 700 arranged according to at least one embodiment of the present disclosure. As illustrated, the environment 700 includes the lens 110, the PCB 115, the optical portion 220, the optical channels 222, the lens frame 225, the legs 230, the top surface 332 of the PCB 115, the underfill layer 335, the COGA 340, the structural epoxy bond 345, and the UV epoxy bond 348. In these or other embodiments, the legend and associated color shading of FIG. 7 may indicate a respective amount of stress for a corresponding position in the environment 700. As shown in FIG. 7, an amount of stress at 150° C. in the environment 700 may be in a closed range of [0 MPa, 200 MPa] given, for example, that the lens frame 225 in FIG. 7 includes PEEK. In comparison, some other techniques (e.g., including Ultem® for both the optical portion 220 and the lens frame 225) at 150° C. may also result in stress of a corresponding environment 700 being in a closed range of [0 MPa, 200 MPa]. At 150° C., the highest stress may occur near the interface between the COGA 340 and the PCB 115. Given the same material for the COGA 340 and the PCB 115 for both of a single-material lens (e.g., an Ultem® lens) and a composite lens as described herein, the stress near the prior-mentioned interface is about same.

Figure 8:
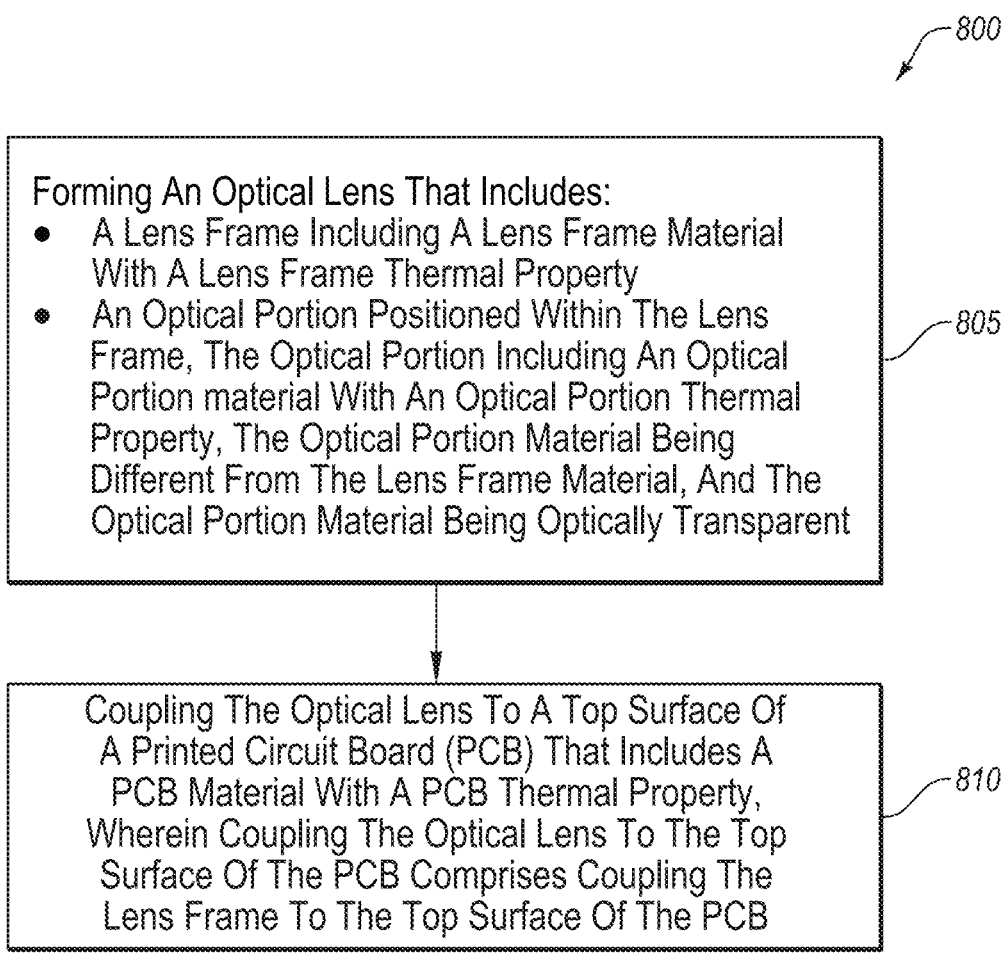
FIG. 8 illustrates a flow diagram of an example method to manufacture an optoelectronic assembly, all arranged in accordance with at least one embodiment described herein.

FIG. 8 illustrates a flow diagram of an example method 800 to manufacture an optoelectronic assembly, arranged in accordance with at least one embodiment described herein. The method 800 may be arranged to manufacture at least one of the embodiments described herein. In these and other embodiments, some or all of the steps of the method 800 may be performed based on the execution of computer-readable instructions stored on one or more non-transitory computer-readable media. Although illustrated as discrete blocks, various blocks may be divided into additional blocks, combined into fewer blocks, or eliminated, depending on the desired implementation.

The method 800 may begin at block 805 at which an optical lens may be formed. The optical lens may include a lens frame including a lens frame material with a lens frame thermal property. The optical lens may also include an optical portion positioned within the lens frame, the optical portion including an optical portion material with an optical portion thermal property, the optical portion material being different from the lens frame material, and the optical portion material being optically transparent. Block 805 may be followed by block 810.

At block 810, the optical lens may be coupled to a top surface of a PCB that includes a PCB material with a PCB thermal property. In these or other embodiments, coupling the optical lens to the top surface of the PCB may include coupling the lens frame to the top surface of the PCB.

In an example embodiment, the PCB, lens frame, and optical portion thermal properties may include CTE. The PCB thermal property of the PCB material and the lens frame thermal property of the lens frame material may be matched. For example, the PCB thermal property and the lens frame thermal property may be similar or identical to each other. Alternatively or additionally, the optical portion thermal property of the optical portion of the lens may be different than the PCB and lens frame thermal properties. Specifically, for instance, the PCB and lens frame thermal properties may each include a CTE in a range from about $5 \times 10^{-6}$ m/m °C. to about $20 \times 10^{-6}$ m/m °C., while the optical portion thermal property may include a CTE in a range from about $45 \times 10^{-6}$ m/m °C. to about $55 \times 10^{-6}$ m/m °C.

One skilled in the art will appreciate that, for these processes, operations, and methods, the functions and/or operations performed may be implemented in differing order. Furthermore, the outlined functions and operations are only provided as examples, and some of the functions and operations may be optional, combined into fewer functions and operations, or expanded into additional functions and operations without detracting from the essence of the disclosed embodiments.

In accordance with common practice, the various features illustrated in the drawings may not be drawn to scale. The illustrations presented in the present disclosure are not meant to be actual views of any particular apparatus (e.g., device, system, etc.) or method, but are merely idealized representations that are employed to describe various embodiments of the disclosure. Accordingly, the dimensions of the various features may be arbitrarily expanded or reduced for clarity. In addition, some of the drawings may be simplified for clarity. Thus, the drawings may not depict all of the components of a given apparatus (e.g., device) or all operations of a particular method.

Terms used herein and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc. For example, the use of the term "and/or" is intended to be construed in this manner. Additionally, the terms "about" and "approximately" should be interpreted to mean a range relative to actual value: 90%≤actual value≤110%.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B."

However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

Additionally, the use of the terms "first," "second," "third," etc., are not necessarily used herein to connote a specific order or number of elements. Generally, the terms "first," "second," "third," etc., are used to distinguish between different elements as generic identifiers. Absence a showing that the terms "first," "second," "third," etc., connote a specific order, these terms should not be understood to connote a specific order. Furthermore, absence a showing that the terms "first," "second," "third," etc., connote a specific number of elements, these terms should not be understood to connote a specific number of elements. For example, a first widget may be described as having a first side and a second widget may be described as having a second side. The use of the term "second side" with respect to the second widget may be to distinguish such side of the second widget from the "first side" of the first widget and not to connote that the second widget has two sides.

All examples and conditional language recited herein are intended for pedagogical objects to aid the reader in understanding the invention and the concepts contributed by the inventor to furthering the art, and are to be construed as being without limitation to such specifically recited examples and conditions. Although embodiments of the present disclosure have been described in detail, it should be understood that the various changes, substitutions, and alterations could be made hereto without departing from the spirit and scope of the present disclosure.

What is claimed is:

1. An optoelectronic assembly comprising:
a printed circuit board (PCB) including a top surface, at least a portion of the top surface including a first material with a first coefficient of thermal expansion (CTE); and
an optical lens including:
a lens frame coupled to the top surface of the PCB, the lens frame including a second material with a second coefficient of thermal expansion (CTE), the second material being different from the first material; and
an optical portion positioned within the lens frame, the optical portion including a third material with a third coefficient of thermal expansion (CTE), the third material being different from the first material and the second material, and the third material being optically transparent,
wherein the first CTE of the first material and the second CTE of the second material are similar or identical; and
wherein the third CTE of the third material is higher than at least the second CTE of the second material.

2. The optoelectronic assembly of claim 1, wherein the second material of the lens frame is configured to reduce lateral displacement of the optical lens in a direction parallel to the top surface of the PCB when the optoelectronic assembly is heated during epoxy curing and/or operation.

3. The optoelectronic assembly of claim 1, wherein the second material of the lens frame is configured to reduce a bending stress of the optical lens when the optoelectronic assembly is heated during epoxy curing and/or operation.

4. The optoelectronic assembly of claim 1, wherein the lens frame is coupled to the top surface of the PCB via an epoxy bond cured at about 150° Celsius.

5. The optoelectronic assembly of claim 4, wherein during curing of the epoxy bond, the second material of the lens frame is configured to limit lateral displacement of the optical lens in a direction parallel to the top surface of the PCB to be an amount of lateral displacement in a closed range of [−12 μm, 12 μm].

6. The optoelectronic assembly of claim 1, wherein:
the lens frame includes legs extending from a bottom surface of the lens frame; and the lens frame is coupled to the top surface of the PCB with an epoxy bond between
the legs and the top surface of the PCB.

7. The optoelectronic assembly of claim 1, wherein under an operational temperature of 75° Celsius, the second material of the lens frame is configured to limit bending stress of the optical lens to be an amount of bending stress in a closed range of [0 MPa, 50 MPa].

8. An optoelectronic assembly comprising:
a printed circuit board (PCB) including a top surface, at least a portion of the top surface including a first material with a first thermal property; and
an optical lens including:
a lens frame coupled to the top surface of the PCB, the lens frame including a second material with a second thermal property, the second material being different from the first material, wherein the second material includes polyether ether ketone (PEEK); and
an optical portion positioned within the lens frame, the optical portion including a third material with a third thermal property, the third material being different from the first material and the second material, and the third material being optically transparent.

9. The optoelectronic assembly of claim 8, wherein:
the first thermal property of the first material, the second thermal property of the second material, and the third thermal property of the third material include a respective coefficient of thermal expansion (CTE);
the CTE of the first material and the CTE of the second material are similar or identical; and
the CTE of the third material is higher than at least the CTE of the second material.

10. The optoelectronic assembly of claim 8, wherein the second material further includes glass fiber.

11. A method to manufacture an optoelectronic assembly, the method comprising:
forming an optical lens that includes:
a lens frame including a lens frame material with a first coefficient of thermal expansion (CTE); and
an optical portion positioned within the lens frame, the optical portion including an optical portion material with a second coefficient of thermal expansion (CTE), the optical portion material being different from the lens frame material, and the optical portion material being optically transparent; and
coupling the optical lens to a top surface of a printed circuit board (PCB) that includes a PCB material with a third coefficient of thermal expansion (CTE),
wherein coupling the optical lens to the top surface of the PCB comprises coupling the lens frame to the top surface of the PCB;
the third CTE of the PCB material and the first CTE of the lens frame material are similar or identical; and
the second CTE of the optical portion material is higher than the first CTE of the lens frame material.

12. The method of claim 11, wherein the lens frame material of the lens frame is configured to reduce lateral displacement of the optical lens in a direction parallel to the top surface of the PCB when the optoelectronic assembly is heated during epoxy curing and/or operation.

13. The method of claim 11, wherein the lens frame material of the lens frame is configured to reduce a bending stress of the optical lens when the optoelectronic assembly is heated during epoxy curing and/or operation.

14. The method of claim 11, wherein coupling the optical lens to the top surface of the PCB includes coupling the lens frame to the top surface of the PCB via an epoxy bond cured at about 150° Celsius.

15. The method of claim 14, wherein during curing of the epoxy bond, the lens frame material of the lens frame is configured to limit lateral displacement of the optical lens in a direction parallel to the top surface of the PCB to be an amount of lateral displacement in a closed range of [−12 μm, 12 μm].

16. The method of claim 11, wherein:
the lens frame includes legs extending from a bottom surface of the lens frame; and coupling the optical lens to the top surface of the PCB includes coupling the lens frame to the top surface of the PCB via an epoxy bond between the legs and the top surface of the PCB.

17. The method of claim 11, wherein under an operational temperature of 75° Celsius, the lens frame material of the lens frame is configured to limit bending stress of the optical lens to be an amount of bending stress in a closed range of [0 MPa, 50 MPa].

18. A method to manufacture an optoelectronic assembly, the method comprising:
forming an optical lens that includes:
a lens frame including a lens frame material with a lens frame thermal property, wherein the lens frame material includes polyether ether ketone (PEEK); and
an optical portion positioned within the lens frame, the optical portion including an optical portion material with an optical portion thermal property, the optical portion material being different from the lens frame material, and the optical portion material being optically transparent; and
coupling the optical lens to a top surface of a printed circuit board (PCB) that includes a PCB material with a PCB thermal property, wherein coupling the optical lens to the top surface of the PCB comprises coupling the lens frame to the top surface of the PCB.

19. The method of claim 18, wherein:
the PCB thermal property of the PCB material, the lens frame thermal property of the lens frame material, and the optical portion thermal property of the optical portion material include a respective coefficient of thermal expansion (CTE);
the CTE of the PCB material and the CTE of the lens frame material are similar or identical; and
the CTE of the optical portion material is higher than the CTE of the lens frame material.

20. The method of claim 18, wherein the lens frame material further includes glass fiber.

* * * * *